US012502709B2

(12) United States Patent
Takazawa et al.

(10) Patent No.: US 12,502,709 B2
(45) Date of Patent: Dec. 23, 2025

(54) RARE EARTH MAGNET AND METHOD FOR MANUFACTURING THE SAME

(71) Applicant: TOYOTA JIDOSHA KABUSHIKI KAISHA, Toyota (JP)

(72) Inventors: Mayumi Takazawa, Okazaki (JP); Kazuaki Haga, Toyota (JP); Daisuke Ichigozaki, Toyota (JP); Masaaki Ito, Anjo (JP); Hisanori Koma, Miyoshi (JP); Shinya Sano, Toyota (JP); Kensuke Komori, Toyota (JP); Keiu Kanada, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/545,245

(22) Filed: Dec. 8, 2021

(65) Prior Publication Data

US 2022/0203440 A1 Jun. 30, 2022

(30) Foreign Application Priority Data

Dec. 28, 2020 (JP) ................................ 2020-218316

(51) Int. Cl.
*H01F 41/02* (2006.01)
*B22F 3/16* (2006.01)
*B22F 3/24* (2006.01)

(52) U.S. Cl.
CPC .................. *B22F 3/24* (2013.01); *B22F 3/16* (2013.01); *H01F 41/0286* (2013.01); *H01F 41/0293* (2013.01); *B22F 2003/247* (2013.01); *B22F 2003/248* (2013.01)

(58) Field of Classification Search
None
See application file for complete search history.

(56) References Cited

U.S. PATENT DOCUMENTS 9,928,956 B2 * 3/2018 Kitahara ............. H01F 41/0293
2006/0278517 A1 12/2006 Machida et al.
2011/0000586 A1 * 1/2011 Nomura ................ C22C 1/1094 148/514

(Continued)

FOREIGN PATENT DOCUMENTS

CN 106024364 A 10/2016
CN 106716573 A 5/2017

(Continued)

OTHER PUBLICATIONS

Machine translation of CN 209030005U. (Year: 2019).*

*Primary Examiner* — Xiaowei Su
(74) *Attorney, Agent, or Firm* — Oliff PLC

(57) ABSTRACT

Provided is a rare earth magnet that allows suppressing deterioration of magnetic properties and a method for manufacturing the same. The rare earth magnet of the present disclosure includes a magnet body containing a rare earth element R1, a transition metal element T, and boron B and includes a main phase. A region in the vicinity of a corner portion of the magnet body of a constituent surface constituting a surface of the magnet body is a processed surface on which a removal process has been performed, and a region closer to a center than the region in the vicinity of the corner portion of the constituent surface is a non-processed surface on which the removal process is not performed.

1 Claim, 11 Drawing Sheets

(56) References Cited

U.S. PATENT DOCUMENTS

| | | | | |
|---|---|---|---|---|
| 2015/0097643 | A1* | 4/2015 | Takagi | B23K 20/233 335/306 |
| 2017/0323722 | A1 | 11/2017 | Yamagata et al. | |
| 2018/0025820 | A1* | 1/2018 | Kakoki | C22C 30/02 428/546 |
| 2019/0115125 | A1 | 4/2019 | Tsubokura et al. | |
| 2019/0326054 | A1* | 10/2019 | Suzuki | H01F 1/0536 |
| 2020/0111591 | A1 | 4/2020 | Ohashi et al. | |
| 2020/0366143 | A1 | 11/2020 | Pydin et al. | |
| 2021/0272727 | A1 | 9/2021 | Komuro et al. | |
| 2021/0296049 | A1* | 9/2021 | Xu | H01F 1/053 |

FOREIGN PATENT DOCUMENTS

| | | | |
|---|---|---|---|
| CN | 109686523 | A | 4/2019 |
| CN | 209030005 | U * | 6/2019 |
| EP | 3 211 647 | A1 | 8/2017 |
| JP | H10-064746 | A | 3/1998 |
| JP | 2003-100537 | A | 4/2003 |
| JP | 2004-304038 | A | 10/2004 |
| JP | 2005-285859 | A | 10/2005 |
| JP | 2016-189422 | A | 11/2016 |
| JP | 2020-021804 | A | 2/2020 |
| JP | 2020-057734 | A | 4/2020 |
| JP | 2020-191695 | A | 11/2020 |

* cited by examiner

RARE EARTH MAGNET AND METHOD FOR MANUFACTURING THE SAME

CROSS REFERENCE TO RELATED APPLICATIONS

The present application claims priority from Japanese patent application JP 2020-218316 filed on Dec. 28, 2020, the entire content of which is hereby incorporated by reference into this application.

BACKGROUND

Description of Related Art

The present disclosure relates to a rare earth magnet and a method for manufacturing the same, and relates to a rare earth magnet including a magnet body containing a rare earth element, a transition metal element, and boron and a method for manufacturing the same.

Background Art

A rare earth magnet that includes a magnet body containing a rare earth element, a transition metal element, and boron and including main phases and subphases that are present surrounding the main phases and contain the rare earth elements more than the main phases, for example, a Nd—Fe—B-based rare earth magnet, has been known as a high performance magnet excellent in magnetic properties and is used for, for example, a motor, such as an internal magnet motor (an IPM motor), mounted on an electric-powered vehicle, such as an electric vehicle (EV) and a hybrid vehicle (HV). This type of rare earth magnet develops a strong magnetism by the main phases, and the subphases magnetically separate the main phases to generate coercivity, thus allowing obtaining high magnetic properties.

To use this type of rare earth magnet for the actual motor or the like, a molded powder compact (green compact), which is produced by performing compression molding on raw material powders containing a rare earth element, a transition metal element, and boron such that the molded powder compact has a shape for manufacturing a magnet body of a rare earth magnet, is sintered to obtain a sintered body. After that, the sintered body is molded to have a shape and dimensions used for the final product by a removal process, such as machining and/or cutting, to manufacture the magnet body. As a result, in the magnet body of the rare earth magnet, the subphases are removed in a surface part of a processed surface, or damage such as a crack, stress due to processing strain, or the like occurs. By thus decreasing the coercivity at the surface part, successive demagnetization in which demagnetization occurs even at a small reverse magnetic field and the demagnetization increases as the reverse magnetic field increases possibly occurs. In view of this, the magnetic properties of the surface part are lower than those of the inside, the magnetic properties of the rare earth magnet are possibly deteriorated, and especially in a motor for electric-powered vehicle, a possibility of deterioration of the magnetic properties due to the demagnetization of the rare earth magnet is high.

To deal with the problem, a technique that performs a heat treatment in a state where a material that contains a rare earth element is caused to be present on a surface as a processed surface of a magnet body of a rare earth magnet and diffuses the rare earth element into the magnet body to modify the surface part of the magnet body and recover magnetic properties of the rare earth magnet has been applied. As the rare earth magnet to which the technique is applied, for example, JP 2004-304038 A describes a rare earth magnet that is a rare earth magnet formed by machining a magnet block material and that has desired magnetic properties by diffusing and penetrating a rare earth metal from a magnet surface to an inside of the magnet to a depth equivalent to radii of crystal grains exposed to an outermost surface of the magnet or more to modify a degenerated damaged portion by processing. JP 2005-285859 A discloses a rare earth sintered magnet in which a magnet body is manufactured by sintering a molded body produced by molding raw material alloy fine powders containing a rare earth element, a transition metal element, and boron, the magnet body is coated with a chemical vapor deposition film with a rare earth element as its entity and a recovery process has been performed on its surface.

SUMMARY

Conventionally, in the method for manufacturing this kind of rare earth magnet, to manufacture the magnet body by obtaining the sintered body by sintering the molded powder compact and after that molding the sintered body to have the shape and the dimensions used for the product by the removal process as described above, the removal process was performed on the entire surface of the sintered body. As a result, the entire constituent surface of the magnet body becomes a processed surface. In view of this, in the magnet body of the rare earth magnet, the subphases were removed from the surface part of the entire constituent surface or damage or stress occurred, and magnetic properties of the surface part of the entire constituent surface lowered compared with those of the inside, and thus deterioration of the magnetic properties of the rare earth magnet was possibly remarkable.

On the other hand, in a case where the rare earth element is diffused into the surface part of the entire constituent surface of the magnet body to suppress the remarkable deterioration of the magnetic properties, usage of the expensive rare earth element increases, possibly resulting in an increase in manufacturing cost.

The present disclosure provides a rare earth magnet that allows suppressing deterioration of magnetic properties and a method for manufacturing the same.

In order to solve the problem, a rare earth magnet according to the present disclosure comprises a magnet body that contains a rare earth element R1, a transition metal element T, and boron B and includes a main phase. A region in the vicinity of a corner portion of the magnet body of a constituent surface constituting a surface of the magnet body is a processed surface on which a removal process has been performed, and a region closer to a center than the region in the vicinity of the corner portion of the constituent surface is a non-processed surface on which the removal process is not performed.

According to the rare earth magnet of the present disclosure, deterioration of magnetic properties can be suppressed.

The rare earth magnet may further comprise a rare-earth-rich layer disposed on the processed surface of the magnet body.

In order to solve the problem, a method for manufacturing the rare earth magnet according to the present disclosure is a method that manufactures the above-described rare earth magnet. The method comprises: performing compression molding on raw material powders containing a rare earth element R1, a transition metal element T, and boron B such that the raw material powders have a shape for manufacturing the magnet body of the rare earth magnet to obtain a molded body; sintering the molded body to obtain a sintered body; and performing a removal process on a surplus part at a corner portion of the sintered body and in the vicinity of the corner portion to manufacture the magnet body.

The method for manufacturing the rare earth magnet according to the present disclosure allows suppressing the deterioration of the magnetic properties of the rare earth magnet.

The method for manufacturing the rare earth magnet may further comprise performing a heat treatment in a state where a diffusion material containing a rare earth element R2 is caused to be present on the processed surface of the magnet body.

Furthermore, in order to solve the problem, a method for manufacturing a rare earth magnet according to the present disclosure comprises: collecting the above-described rare earth magnet from a motor; and performing a heat treatment in a state where a diffusion material containing a rare earth element R2 is caused to be present on the processed surface of the magnet body of the rare earth magnet.

The method for manufacturing the rare earth magnet according to the present disclosure allows regenerating the rare earth magnet wherein the magnetic properties are recovered from the rare earth magnet whose magnetic properties are deteriorated.

Effect

With the present disclosure, the deterioration of the magnetic properties of the rare earth magnet can be suppressed.

DETAILED DESCRIPTION OF THE EMBODIMENTS

The following will describe embodiments according to a rare earth magnet and a method for manufacturing the same according to the present disclosure.

Figure 1A:
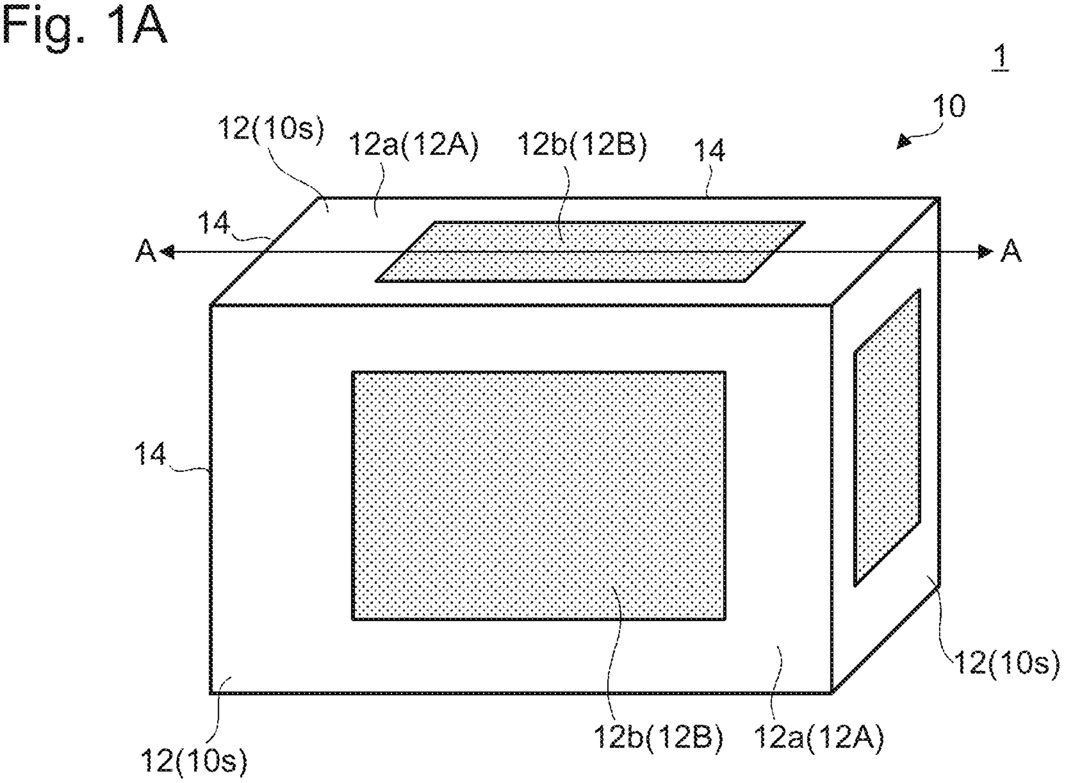
FIG. 1A is a schematic perspective view illustrating a rare earth magnet according to a first embodiment.
Figure 1B:
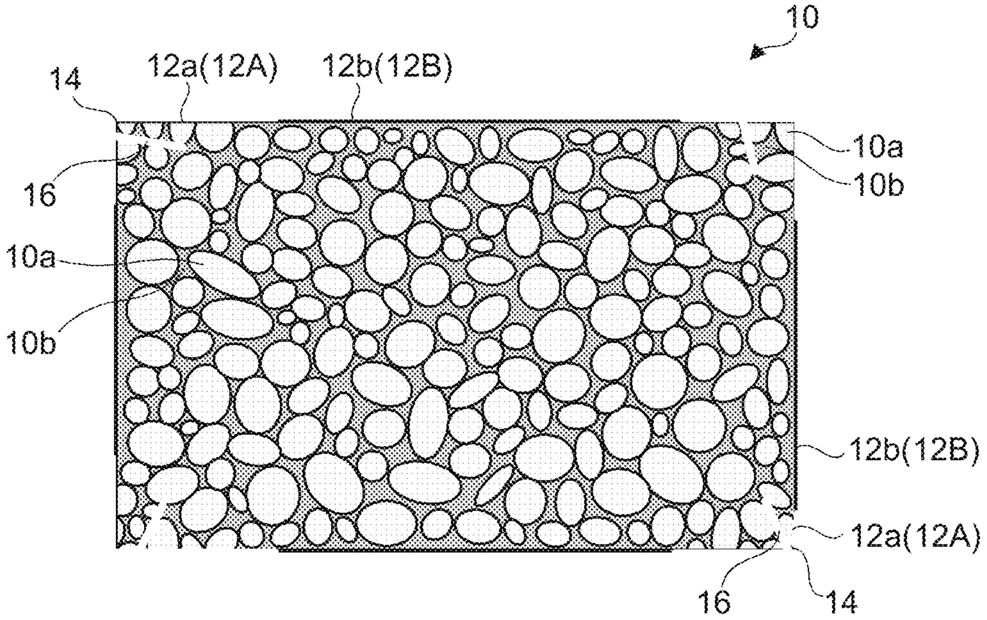
FIG. 1B is a schematic cross-sectional view taken along the line A-A of the rare earth magnet illustrated in FIG. 1A.

First, an outline of the rare earth magnet according to the embodiment will be described with a rare earth magnet according to a first embodiment as an example. FIG. 1A is a schematic perspective view illustrating the rare earth magnet according to the first embodiment, and FIG. 1B is a schematic cross-sectional view taken along the line A-A of the rare earth magnet illustrated in FIG. 1A. Meanwhile, FIG. 2A is a schematic perspective view illustrating a rare earth magnet according to a related art, and FIG. 2B is a schematic cross-sectional view taken along the line A-A of the rare earth magnet illustrated in FIG. 2A.

As illustrated in FIG. 1A and FIG. 1B, a rare earth magnet 1 according to the first embodiment includes a magnet body 10 having a rectangular parallelepiped shape that contains a rare earth element R1, a transition metal element T, and boron B and includes main phase particles (main phases) 10*a* and subphases 10*b* that are present surrounding the main phase particles 10*a*. The main phase particles 10*a* are phases having a $R_2Fe_{14}B$ crystalline structure, and the subphases 10*b* are phases containing the rare earth elements R1 more than the main phase particles 10*a*. Regions 12A in the vicinities of corner portions 14 of the magnet body 10 of all of constituent surfaces 12 constituting surfaces 10*s* of the magnet body 10 are processed surfaces (polished surfaces) 12*a* on which a polishing process (a removal process) has been performed, and regions 12B closer to the centers than the regions 12A in the vicinities of the corner portions 14 of all of the constituent surfaces 12 are non-processed surfaces 12*b* on which the polishing process has not been performed. Although not illustrated, the rare earth magnet 1 further includes an Ni plating or a coating film formed on the surface 10*s* of the magnet body 10 by surface treatment.

Figure 2A:
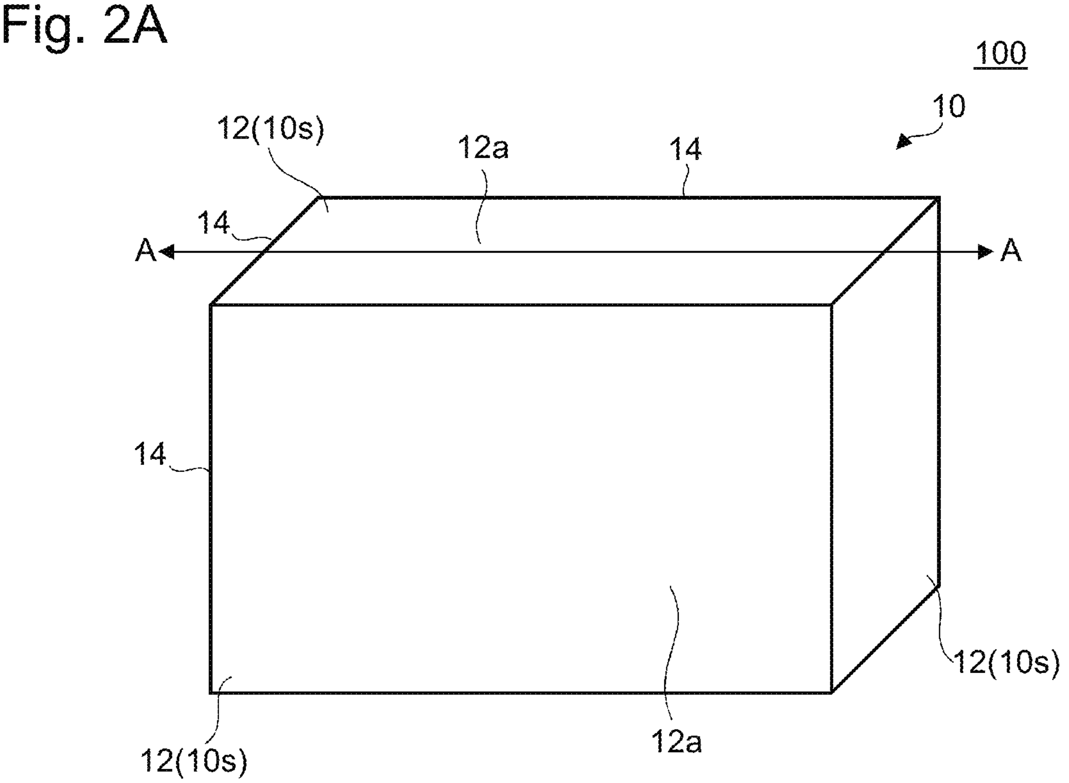
FIG. 2A is a schematic perspective view illustrating a rare earth magnet according to a related art.
Figure 2B:
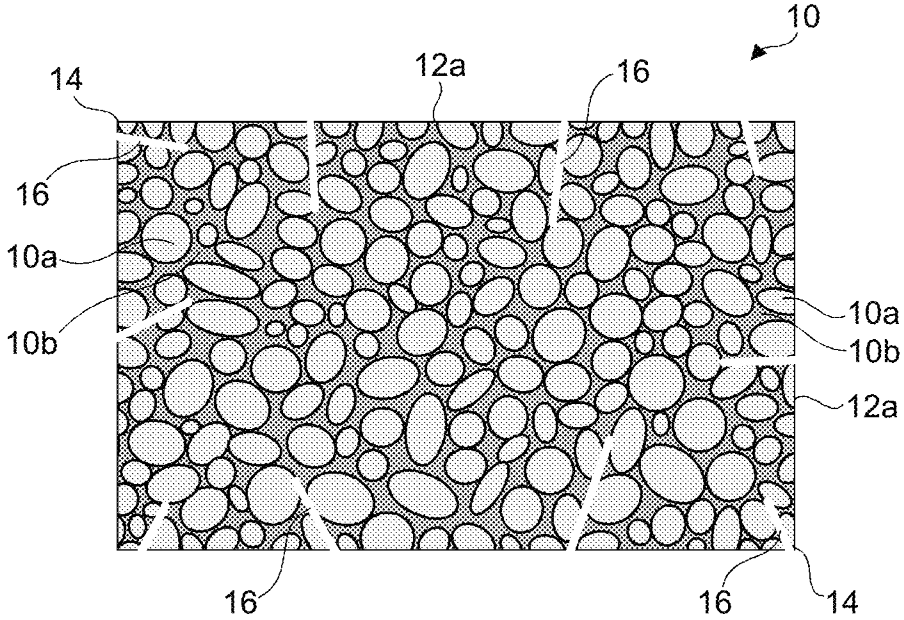
FIG. 2B is a schematic cross-sectional view taken along the line A-A of the rare earth magnet illustrated in FIG. 2A.

Meanwhile, similarly to the first embodiment, as illustrated in FIG. 2A and FIG. 2B, a rare earth magnet 100 according to the related art includes the magnet body 10 having a rectangular parallelepiped shape that contains the rare earth element R1, the transition metal element T, and the boron B and includes the main phase particles (the main phases) 10*a* and the subphases 10*b* that are present surrounding the main phase particles 10*a*. However, different from the first embodiment, in the rare earth magnet 100, the entire surfaces 10*s* of the magnet body 10, that is, all of the entire constituent surfaces 12 are the processed surfaces (the polished surfaces) 12*a* on which the polishing process has been performed. In view of this, the subphases 10*b* are removed in the surface parts of all of the entire constituent surfaces 12 of the magnet body 10, and a crack 16 reaching the inside of the magnet body 10 or stress due to processing strain occurs. As a result, a decrease in coercivity of the surface part of the constituent surface 12 of the magnet body 10 is remarkable, and magnetic properties of the rare earth magnet 100 are significantly deteriorated.

In contrast to this, in the rare earth magnet 1 according to the first embodiment, only the regions 12A in the vicinities of the corner portions 14 are the processed surfaces 12*a* in all of the constituent surfaces 12 of the magnet body 10, and the regions 12B closer to the centers than the regions 12A in the vicinities of the corner portions 14 are the non-processed surfaces 12*b*. In the surface part of the processed surface 12*a* in the magnet body 10, the subphases 10*b* are removed and the crack 16 reaching the inside of the magnet body 10 or the stress due to processing strain occurs, but in the surface part of the non-processed surface 12*b*, the subphases 10*b* are not removed and the crack 16 reaching the inside of the magnet body 10 or the stress due to processing strain does not occur. Accordingly, the rare earth magnet 1 according to the first embodiment allows suppressing the decrease in coercivity of the surface part of the constituent surface 12 of the magnet body 10 and suppressing the deterioration of the magnetic properties of the rare earth magnet 1. Specifically, the rare earth magnet 1 allows suppressing demagnetization even at a small reverse magnetic field and the significant demagnetization as the reverse magnetic field increases, and suppressing a decrease in residual magnetic flux density. This allows obtaining a sufficient torque in a case where the rare earth magnet 1 is used for a motor.

Figure 3A:
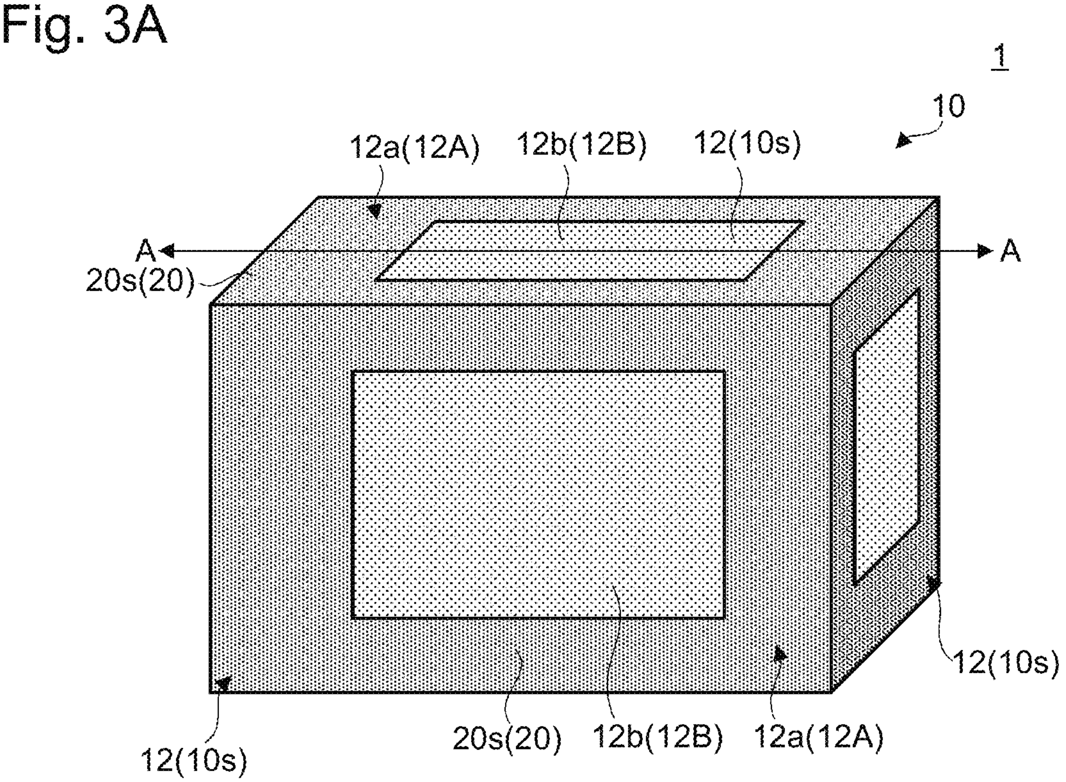
FIG. 3A is a schematic perspective view illustrating a rare earth magnet according to a second embodiment.
Figure 3B:
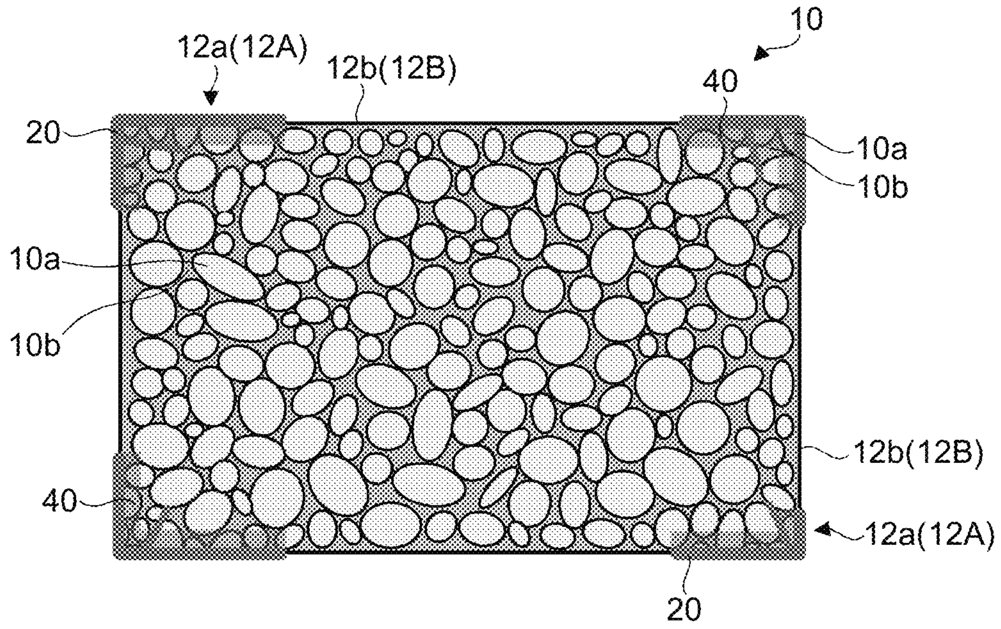
FIG. 3B is a schematic cross-sectional view taken along the line A-A of the rare earth magnet illustrated in FIG. 3A.

Subsequently, a rare earth magnet according to a second embodiment will be further described as an example. FIG. 3A is a schematic perspective view illustrating the rare earth magnet according to the second embodiment, and FIG. 3B is a schematic cross-sectional view taken along the line A-A of the rare earth magnet illustrated in FIG. 3A. Meanwhile, FIG. 4A is a schematic perspective view illustrating a rare earth magnet according to a related art, and FIG. 4B is a schematic cross-sectional view taken along the line A-A of the rare earth magnet illustrated in FIG. 4A.

As illustrated in FIG. 3A and FIG. 3B, the rare earth magnet 1 according to the second embodiment further includes a rare-earth-rich layer 20 disposed to cover the main phase particles 10*a* on the processed surface 12*a* of the constituent surface 12 of the magnet body 10, in addition to the magnet body 10 according to the first embodiment. A diffusion layer 40 is disposed on the surface part of the processed surface 12*a* of the constituent surface 12 and the surface part is modified. The rare-earth-rich layer 20 is not disposed on the non-processed surface 12*b* of the constituent surface 12. Although not illustrated, the rare earth magnet 1 further includes Ni platings or coating films formed on the surface 10*s* of the magnet body 10 and a surface of 20*s* of the rare-earth-rich layer 20 by surface treatment.

Figure 4A:
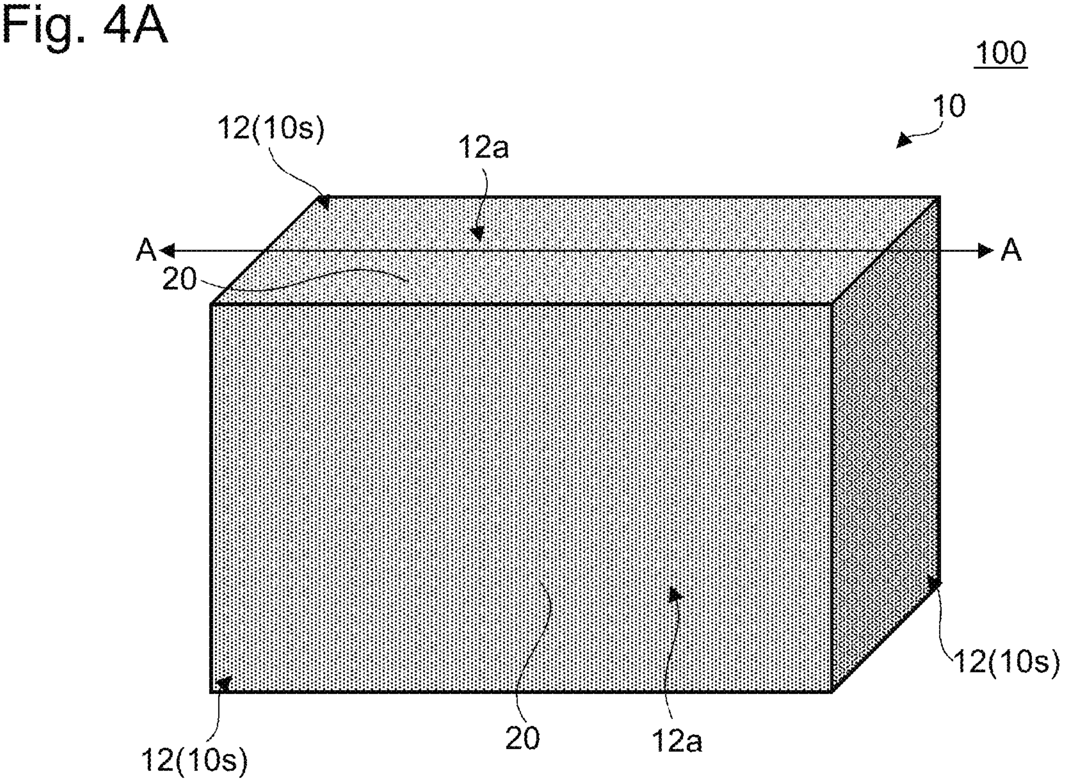
FIG. 4A is a schematic perspective view illustrating a rare earth magnet according to a related art.
Figure 4B:
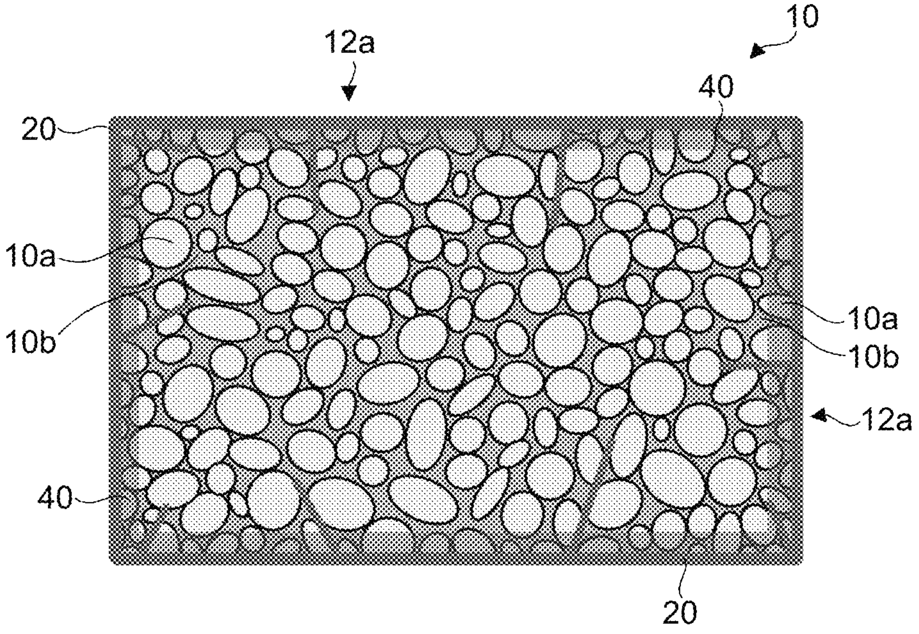
FIG. 4B is a schematic cross-sectional view taken along the line A-A of the rare earth magnet illustrated in FIG. 4A.

Meanwhile, as illustrated in FIG. 4A and FIG. 4B, the rare earth magnet 100 according to the related art further includes the rare-earth-rich layers 20 disposed to cover the main phase particles 10*a* on the processed surface 12*a* of the entire constituent surface 12 of the magnet body 10, in addition to the magnet body 10 according to the related art illustrated in FIG. 2A and FIG. 2B. The diffusion layer 40 is disposed on the surface part of the processed surface 12*a* of the entire constituent surface 12 and the surface part is modified. In view of this, recovering coercivity of the surface part of the processed surface 12*a* of the entire constituent surface 12 allows suppressing the deterioration of the magnetic properties of the rare earth magnet 100. However, usage of the expensive rare earth element increases, possibly resulting in an increase in manufacturing cost.

In contrast to this, in the rare earth magnet 1 according to the second embodiment, the rare-earth-rich layer 20 and the diffusion layer 40 are disposed only in the processed surface 12*a* in the constituent surface 12 of the magnet body 10 and are not disposed in the non-processed surface 12*b*. In view of this, while suppressing the increase in the manufacturing cost, the magnetic properties of the rare earth magnet 1 can be recovered by recovering the coercivity of the surface part of the processed surface 12*a* as a part of the constituent surface 12.

Therefore, the rare earth magnet according to the embodiment allows suppressing the deterioration of the magnetic properties like the first embodiment and the second embodiment. Additionally, in the case where the rare-earth-rich layer disposed on the processed surface of the magnet body is further disposed like the second embodiment, while the increase in the manufacturing cost is suppressed, the magnetic properties can be recovered.

Subsequently, configurations of the rare earth magnet and the method for manufacturing the same according to the embodiments will be described in detail.

1. Magnet Body

As long as the magnet body is a rare earth magnet body containing the rare earth element R1, the transition metal element T, and the boron B, and including the main phases, the magnet body is specifically limited, and usually includes the main phases and the subphases that are present surrounding the main phases.

As long as the magnet body contains the rare earth element R1, the transition metal element T, and the boron B, the composition of the magnet body is not specifically limited, and any given composition is selectable according to the purpose. When the magnet body is a R1-T-B-based magnet body (R1: rare earth element, T: transition metal element, B: boron), from an aspect of making the magnetic properties excellent, for example, a composition in which the rare earth element R1 is 27.0 mass % or more and 32.0 mass % or less, the boron B is 0.5 mass % or more and 2.0 mass % or less, and the balance is substantially the transition metal element T is used in some embodiments. This is because content of the rare earth element R1 being the lower limit or more of the range allows suppressing deposition of soft magnetic a-Fe or the like and a decrease in coercivity, and the content of the rare earth element R1 being the upper limit or less of the range allows suppressing an increase in the amount of subphases and deterioration of a corrosion resistance, and further allows suppressing a decrease in a volume ratio of the main phases and decreasing the residual magnetic flux density. This is because the content of the boron B being the lower limit or more of the range allows obtaining high coercivity, and the content of the boron B being the upper limit or less of the range allows suppressing the decrease in the residual magnetic flux density.

Among the components of the magnet body, as long as the rare earth element R1 is one or two or more selected from Sc, Y, La, Ce, Pr, Nd, Pm, Sm, Eu, Gd, Tb, Dy, Ho, Er, Tm, Yb, and Lu, the rare earth element R1 is not specifically limited, and among them, one or two selected from Nd and Pr are used as the main components in some embodiments. Because the magnetic properties are well balanced, and Nd and Pr are abound in resource and comparatively low prices. One or two or more of transition elements in which, for example, Fe or Fe and Co are included are used for the transition metal element T in some embodiments.

The magnet body is not specifically limited, and examples of which include a Nd—Fe—B-based magnet body and a Pr—Fe—B-based magnet body. The magnet body may be a R-T-B-M-based magnet body further containing an additive element M, in addition to the rare earth element R1, the transition metal element T, and the boron B. Examples of the additive element M include one or two or more selected from Al, Ga, Cr, Mn, Mg, Si, Cu, C, Nb, Sn, W, V, Zr, Ti, Hf, and Mo. Among the additive elements, for example, Nb, Zr, and W, which are high melting point metals, have an effect of suppressing crystal grain growth and are used in some embodiments. Note that the composition of the magnet body is not limited to the compositions described in this specification and can be other compositions applicable to the present disclosure.

The main phase of the magnet body is a phase having a $R_2Fe_{14}B$ crystalline structure. For example, when the magnet body is a Nd—Fe—B-based magnet body, the main phase is $Nd_2Fe_{14}B$. The subphases of the magnet body are phases containing the rare earth elements R1 more than the main phases and are present surrounding the main phases.

The regions in the vicinities of the corner portions of the magnet body of the constituent surface constituting the surface of the magnet body is the processed surface on which the removal process has been performed, and the region closer to the center than the regions in the vicinities of the corner portions of the constituent surface is the non-processed surface on which the removal process is not performed. Here, the "corner portion of the magnet body" means a part where at least two surfaces among the constituent surfaces constituting the surfaces of the magnet body intersect.

As long as the processed surface of the magnet body is a surface on which the removal process has been performed, the processed surface is not specifically limited. However, usually, the subphases are removed or damage, stress, or the like occurs in the processed surface by the removal process, and as a result, the surface part is degenerated and the magnetic properties of the part are deteriorated. The surface on which the removal process has been performed is a surface newly exposed by removal process of a sintered body before being molded as the magnet body, and examples of which include a polished surface, a ground surface, and a cut surface. A surface roughness Ra of the processed surface of the magnet body is, for example, within a range from 0.1 μm or more to 10 μm or less.

The non-processed surface of the magnet body is a part on which the removal process is not performed among the surfaces of the sintered body processed to obtain the magnet body. The surface roughness Ra of the non-processed surface of the magnet body is, for example, within a range from 0.5 μm or more to 50 μm or less.

As long as the shape is a three-dimensional shape having the corner portions, the shape of the magnet body is not specifically limited and can have a general shape of the magnet body of the rare earth magnet used for, for example, a motor mounted on an electric-powered vehicle, examples of which include a polygonal shape, such as a cube and a rectangular parallelepiped, and as long as corner portions are provided, the magnet body may have a shape having curved surfaces as constituent surfaces.

The dimensions of the magnet body are not specifically limited, and can be general dimensions of the magnet body of the rare earth magnet used for, for example, a motor mounted on an electric-powered vehicle. However, for the magnet body having the cube shape or the rectangular parallelepiped shape, for example, dimensions are 3 mm or more to 30 mm or less in width (W), 5 mm or more to 80 mm or less in length (L), and 2 mm or more to 15 mm or less in height (H) in some embodiments. This is because the dimension of the magnet body being the lower limit or more of the range increases an influence of shrinkage at sintering the molded body, and this increases a necessity of performing the removal process on surplus parts at the corner portions of the sintered body and in the vicinities of the corner portions. Additionally, this is because the dimension of the magnet body being the upper limit or less of the range increases a modifying effect of the surface part of the processed surface of the magnet body by the rare-earth-rich layer.

2. Rare-Earth-Rich Layer and Diffusion Layer

The rare earth magnet further includes the rare-earth-rich layer disposed on the processed surface of the magnet body in some embodiments. This allows recovering the coercivity of the surface part of the processed surface of the magnet body and recovering the magnetic properties of the rare earth magnet.

The rare-earth-rich layer is the diffusion material that remains as a layer after a diffusion reaction between the diffusion material and the surface part of the processed surface of the magnet body by performing a heat treatment in a state where the diffusion material containing the rare earth element R2 is caused to be present on the processed surface of the magnet body, and is a layer rich in the rare earth element R2 more than the surface part of the processed surface of the magnet body. In the diffusion reaction between the diffusion material and the surface part of the processed surface of the magnet body, the rare earth element R2 diffuses from the diffusion material into the surface part of the processed surface of the magnet body, and the constituent element diffuses into the diffusion material from the surface part of the processed surface of the magnet body. The rare-earth-rich layer is not specifically limited, and examples of which include a layer in which a film of the diffusion material formed by, for example, PVD or CVD remains on the processed surface of the magnet body after the diffusion reaction and a layer generated by coating the powdery diffusion material over the processed surface of the magnet body and subsequently performing a diffusion process.

As long as the rare earth element R2 is one or two or more selected from Sc, Y, La, Ce, Pr, Nd, Pm, Sm, Eu, Gd, Tb, Dy, Ho, Er, Tm, Yb, and Lu, the rare earth element R2 is not specifically limited, among them, the rare earth element R2 that contains one or two selected from Nd, Pr, Ce, Sm, Dy, and Tb as the main components is used in some embodiments, and especially that contains one or two selected from Dy and Tb as the main components is used in some embodiments. Because they have a large recovery effect of the magnetic properties, such as coercivity.

As long as the rare-earth-rich layer has a thickness with which the magnetic properties of the rare earth magnet can be recovered, the thickness is not specifically limited, and, for example, the thickness is within the range from 0.1 μm or more to 5 μm or less in some embodiments. Because the thickness of the rare-earth-rich layer being the lower limit or more of the range allows sufficiently obtaining the effect of allowing recovering the coercivity of the surface part of the processed surface of the magnet body. Additionally, the thickness of the rare-earth-rich layer being the upper limit or less of the range allows suppressing the decrease in residual magnetic flux density due to the presence of the rare-earth-rich layer and obtaining a sufficient torque in use for a motor, and further allows reducing the usage of the rare earth element and allows reducing an unnecessary cost.

When the rare earth magnet includes the rare-earth-rich layer, a diffusion layer is usually present on the surface part of the processed surface of the magnet body. The diffusion layer is a layer generated by diffusing the rare earth element R2 from the diffusion material into the surface part of the processed surface of the magnet body and is a layer rich in the rare earth elements R2 more than the inside of the magnet body. The diffusion layer allows further recovering the magnetic properties, such as coercivity.

As long as the diffusion layer has a thickness with which the magnetic properties of the rare earth magnet can be recovered, the thickness is not specifically limited, and, for example, the thickness is within the range from 0.1 μm or more to 5 μm or less in some embodiments. Because the thickness of the diffusion layer being the lower limit or more of the range allows sufficiently obtaining the recovery effect of coercivity or the like. Additionally, the thickness of the diffusion layer being the upper limit or less of the range allows avoiding the deterioration of the magnetic properties by the diffusion layer.

3. Rare Earth Magnet

While the application of the rare earth magnet is not specifically limited, for example, the rare earth magnet is used for a motor, such as an internal magnet motor (an IPM motor) mounted on an electric-powered vehicle, such as an electric vehicle (EV) and a hybrid vehicle (HV), an actuator of a hard disk drive, and a motor of a mobile phone. Among them, the rare earth magnet is used for the motor mounted on the electric-powered vehicle in some embodiments.

4. Method for Manufacturing Rare Earth Magnet

The method for manufacturing the rare earth magnet according to the embodiment is a method that manufactures the rare earth magnet according to the embodiment. The manufacturing method includes: a molding step of performing compression molding on raw material powders containing the rare earth element R1, the transition metal element T, and the boron B such that the raw material powders have a shape for manufacturing the magnet body of the rare earth magnet to obtain a molded body; a sintering step of sintering the molded body to obtain a sintered body; and a processing step of performing a removal process on surplus parts at the corner portions and in the vicinities of the corner portions of the sintered body to manufacture the magnet body.

Figure 5:
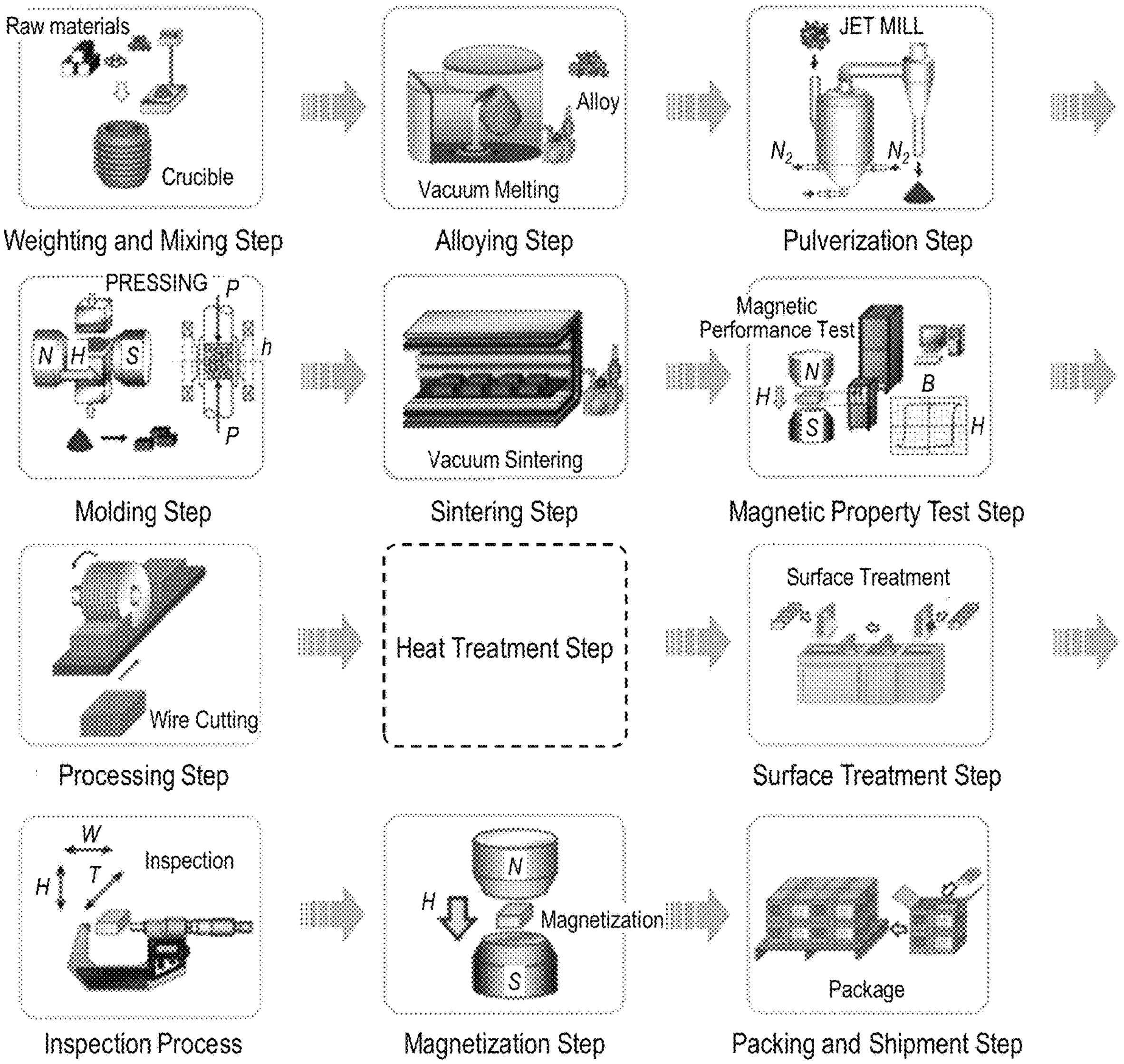
FIG. 5 is a drawing schematically illustrating a procedure of a method for manufacturing the rare earth magnet according to the second embodiment.

Here, an outline of the method for manufacturing the rare earth magnet according to the embodiments will be described with a method for manufacturing the rare earth magnet according to the second embodiment illustrated FIG. 3A and FIG. 3B described above as an example. FIG. 5 is a drawing schematically illustrating a procedure of the method for manufacturing the rare earth magnet according to the second embodiment. FIG. 6A to FIG. 7C are schematic process cross-sectional views of a main part of the method for manufacturing the rare earth magnet according to the second embodiment.

In the method for manufacturing the rare earth magnet according to the second embodiment, first, as illustrated in FIG. 5, according to the composition of the magnet body of the rare earth magnet to be manufactured, the rare earth element R1, the transition metal element T, the boron B, and other additive elements are weighted, and these raw materials are mixed and put in a crucible (a weighting and mixing step).

Next, as illustrated in FIG. 5, the crucible is set in a vacuum melting furnace, a high frequency wave is applied to the crucible to dissolve the raw materials, and the raw materials are homogeneously alloyed. After that, the raw materials are casted into a mold to manufacture an ingot (an alloying step).

Next, as illustrated in FIG. 5, the ingot is pulverized with jet mill or the like in a step including several stages to pulverize the ingot to raw material powders with an average particle size of around several microns (a pulverization step). In this respect, to suppress the raw material powders from oxidizing, pulverization is performed on the raw material powders while the powders are protected under nitrogen or argon atmosphere.

Figure 6A:
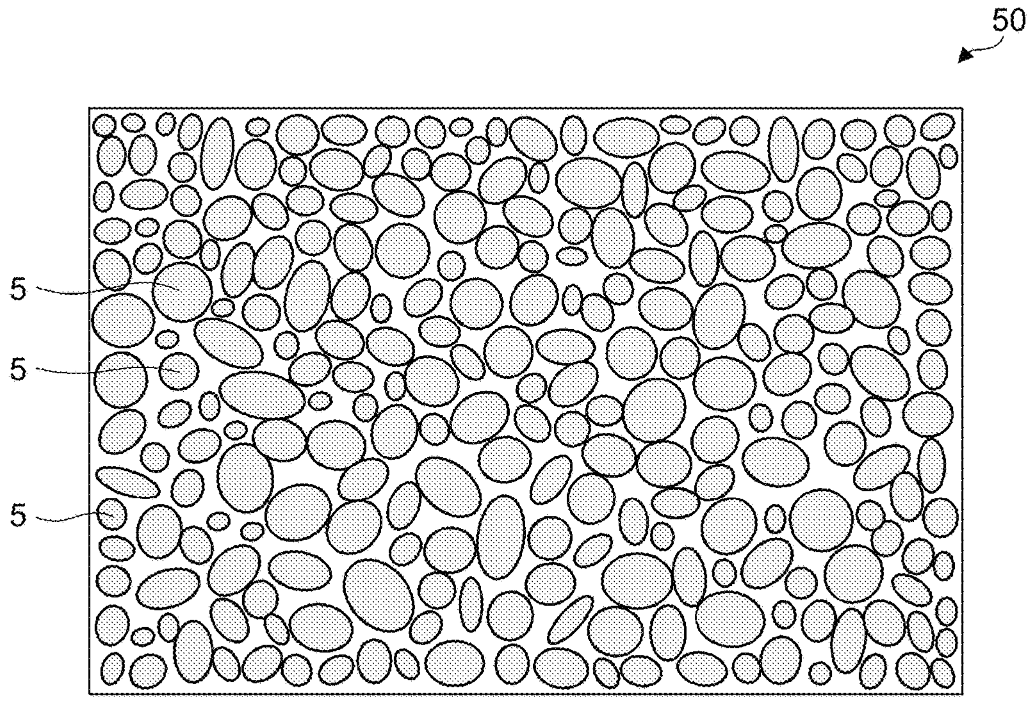
FIG. 6A and FIG. 6B are schematic process cross-sectional views of a main part of the method for manufacturing the rare earth magnet according to the second embodiment.

Next, as illustrated in FIG. 5 and FIG. 6A, compression molding is performed on raw material powders 5 containing the rare earth element R1, the transition metal element T, and the boron B such that the raw material powders 5 have a shape for manufacturing the magnet body of the rare earth magnet according to the second embodiment to obtain a molded body 50 (a molding step). Specifically, press molding is performed on the raw material powders 5 in the mold to which a magnetic field is applied. Thus, crystal orientations of the raw material powders 5 are aligned with a direction of an external magnetic field, thus improving the magnetic properties in the orientation direction.

Figure 6B:
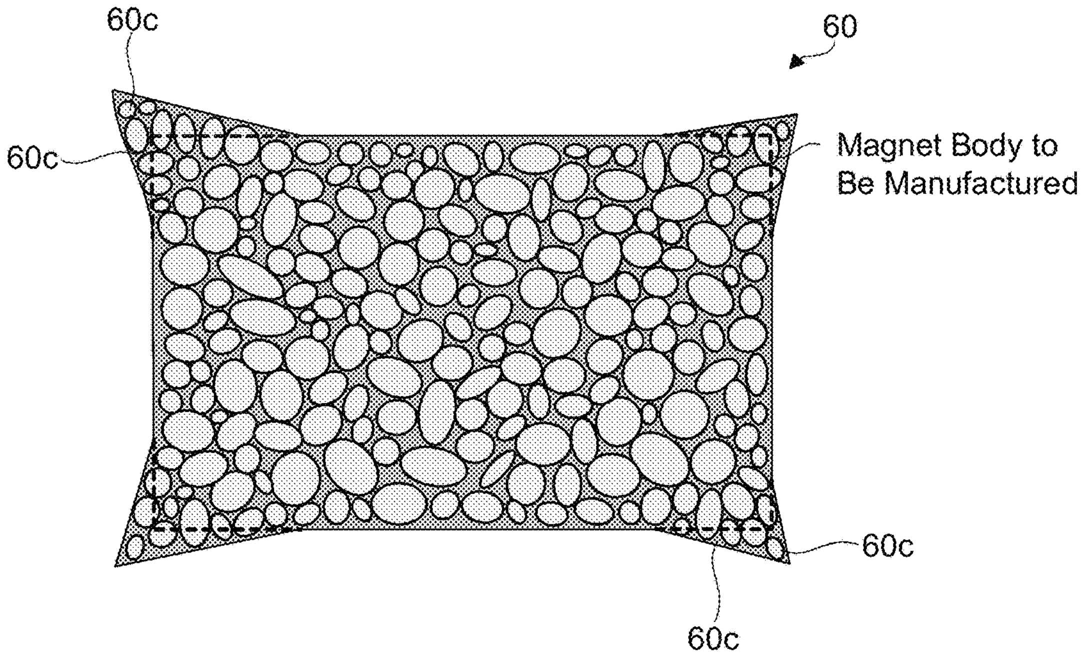

Next, as illustrated in FIG. 5 and FIG. 6B, by sintering the molded body 50, a sintered body 60 is obtained (a sintering step). Specifically, by sintering the molded body 50 in a vacuum sintering furnace, the sintered body 60 is obtained. In this respect, as a result of the change in shape in association with the shrinkage of the molded body 50, the sintered body 60 includes surplus parts 60*c* unnecessary for the magnet body to be manufactured at the corner portions and in the vicinities of the corner portions.

Next, as illustrated in FIG. 5, a test that measures the magnetic properties, such as the residual magnetic flux density and the coercivity of the sintered body 60, is conducted and the sintered bodies 60 that have passed the test are sent to the next step (a magnetic property test step).

Figure 7A:
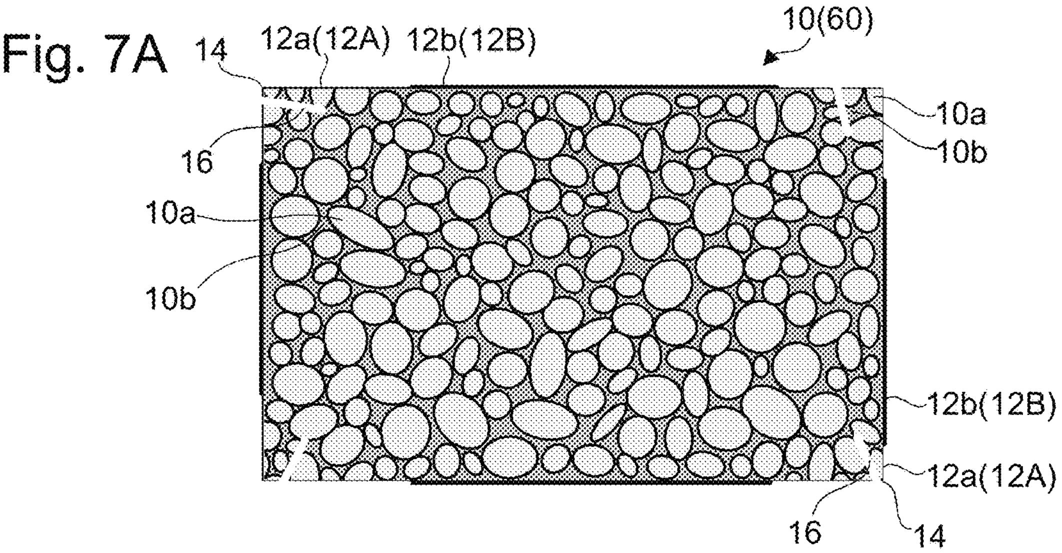
FIG. 7A to FIG. 7C are schematic process cross-sectional views of a main part of the method for manufacturing the rare earth magnet according to the second embodiment.

Next, as illustrated in FIG. 5 and FIG. 7A, the polishing process (the removal process) is performed on the surplus parts 60*c* at the corner portions and in the vicinities of the corner portions of the sintered body 60 to manufacture the magnet body 10 of the rare earth magnet (a processing step). In this respect, by performing the polishing process on the sintered body 60, the newly exposed surface becomes the processed surface (the polished surface) 12*a* of the magnet body 10 and the surface other than the processed surface 12*a* of the magnet body 10 becomes the non-processed surface 12*b*. The magnet body 10 contains the rare earth element R1, the transition metal element T, and the boron B and includes the main phase particles (the main phases) 10*a* and the subphases 10*b* that are present surrounding the main phase particles 10*a*.

Figure 7B:
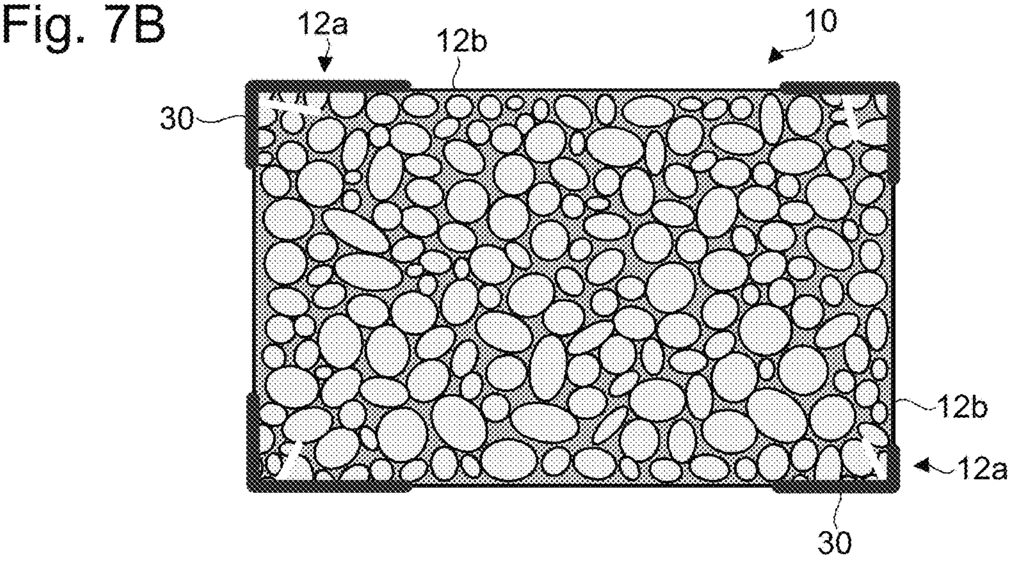
Figure 7C:
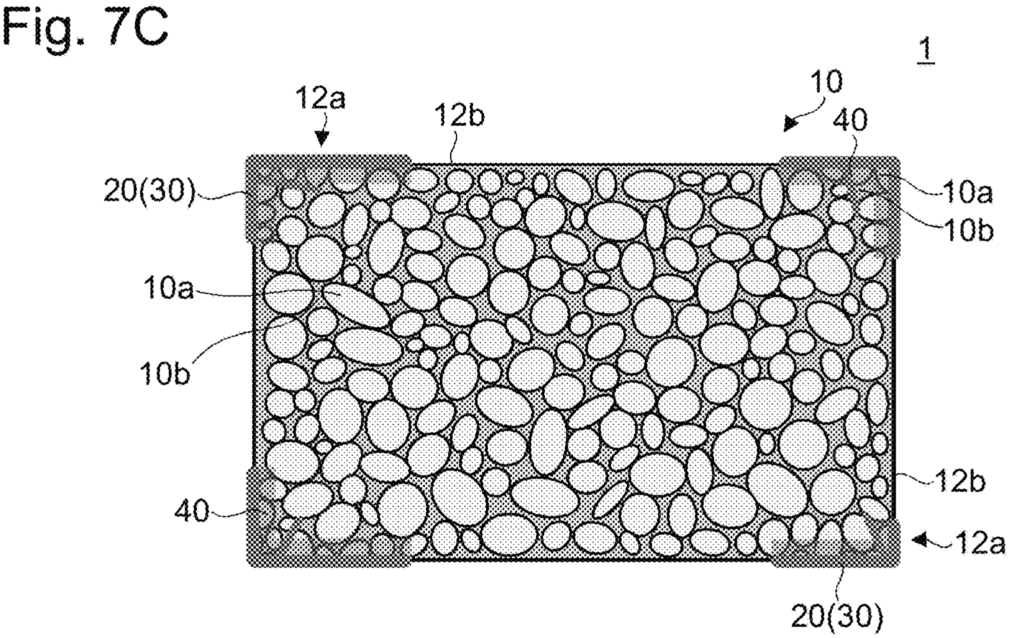

Next, as illustrated in FIG. 5 and FIG. 7B, the heat treatment is performed in a state where a diffusion material 30 containing the rare earth element R2 is caused to be present on the processed surface 12*a* of the magnet body 10 (a heat treatment step). In view of this, as illustrated in FIG. 7C, by diffusing the rare earth element R2 into the surface part of the processed surface 12*a* of the magnet body 10 from the diffusion material 30, the diffusion layer 40 is generated, and the surface part of the processed surface 12*a* of the magnet body 10 is modified. The diffusion material 30 is caused to remain after the diffusion reaction with the surface part of the processed surface 12*a* of the magnet body 10 to form the rare-earth-rich layer 20. In this respect, for example, when the magnet body 10 is a Nd—Fe—B-based magnet body, the rare earth element R2 diffuses into and reacts with surface regions of the main phase particles ($Nd_2Fe_{14}B$) 10*a* facing the processed surface 12*a* of the magnet body 10 to newly generate $(Nd, R2)_2Fe_{14}B$. Furthermore, the surfaces of the main phase particles 10a are covered with the Nd-rich layer (the rare-earth-rich layer) 20. Consequently, the coercivity of the surface part of the processed surface 12a of the magnet body 10 recovers, and the magnetic properties of the magnet body 10 recover. Furthermore, in the process of the diffusion of the rare earth element R2, the crack 16 reaching the inside of the magnet body 10 or stress due to processing strain generated in the polishing process disappears. Consequently, the coercivity inside the magnet body 10 also recovers.

Next, as illustrated in FIG. 5, according to an environment wherein the rare earth magnet are used, various surface treatments are performed on the magnet body 10 where the rare-earth-rich layer 20 is disposed (a surface treatment step). Specifically, for example, in a case where the magnet body 10 is a Nd—Fe—B-based magnet body, the magnet body 10 easily rusts generally, and therefore Ni plating or coating is performed.

Next, as illustrated in FIG. 5, the magnet body 10 on which the surface treatment has been performed is inspected (an inspection process). Specifically, the dimensions and the appearance of the magnet body 10 are inspected. According to product specifications, measurement of the magnetic properties, a corrosion resistance test, strength measurement, and the like are performed.

Next, as illustrated in FIG. 5, the magnet body 10 is magnetized (a magnetization step). Thus, the above-described rare earth magnet 1 according to the second embodiment illustrated in FIG. 3A and FIG. 3B is manufactured. As illustrated in FIG. 5, the manufactured rare earth magnets are packed and shipped (a packing and shipment step).

In the method for manufacturing the rare earth magnet according to the second embodiment, the polishing process is performed on only the surplus parts 60c at the corner portions and in the vicinities of the corner portions of the sintered body 60 to manufacture the magnet body 10 of the rare earth magnet 1. Therefore, the subphases 10b are not removed in the surface part of the non-processed surface 12b of the magnet body 10 and the crack 16 reaching the inside of the magnet body 10 or stress due to the processing strain does not occur. This allows suppressing the decrease in the coercivity of the surface part of the constituent surface 12 of the magnet body 10 and suppressing the deterioration of the magnetic properties of the rare earth magnet 1. Furthermore, the diffusion layer 40 is generated only on the surface part of the processed surface 12a of the magnet body 10 and the part can be modified, and further the rare-earth-rich layer 20 can be formed on the processed surface 12a of the magnet body 10. This allows recovering the magnetic properties of the rare earth magnet 1 while suppressing the increase in the manufacturing cost.

The above-described method for manufacturing the rare earth magnet according to the first embodiment illustrated in FIG. 1A and FIG. 1B differs from the method for manufacturing the rare earth magnet according to the second embodiment in that the heat treatment step is not performed and only steps at and after the surface treatment step is performed on the magnet body 10 where the rare-earth-rich layer 20 is not disposed.

Therefore, the method for manufacturing the rare earth magnet according to the embodiment allows suppressing the deterioration of the magnetic properties of the rare earth magnet. In a case where the heat treatment step that performs the heat treatment in the state where the diffusion material containing the rare earth element R2 is caused to be present on the processed surface of the magnet body is further included, while the increase in the manufacturing cost is suppressed, the magnetic properties of the rare earth magnet can be recovered.

Subsequently, the method for manufacturing the rare earth magnet according to the embodiments will be described in detail.

(1) Molding Step

In the molding step, compression molding is performed on the raw material powders containing the rare earth element R1, the transition metal element T, and the boron B such that the raw material powders have the shape for manufacturing the magnet body of the rare earth magnet to obtain the molded body (green compact).

Since the raw material powders have a composition similar to the composition of the magnet body described in "1. Magnet Body," the description thereof will be omitted here.

The method of compression molding on the raw material powders is not specifically limited, and molding in a magnetic field that performs press molding on the raw material powders in a mold to which a magnetic field is applied is used in some embodiments. The method of the molding in a magnetic field may be a right-angle magnetic field press that applies a magnetic field orthogonal to a press direction or may be a parallel magnetic field press that applies a magnetic field parallel to the press direction. The molding in a magnetic field only needs to be performed, for example, in a magnetic field within the range from 500 kA/m or more to 2000 kA/m or less and at a pressure within the range from 100 MPa or more to 200 MPa or less.

The shape and the dimensions of the molded body formed by compression molding of the raw material powders are not specifically limited as long as the shape and the dimensions can be used to manufacture the magnet body of the rare earth magnet, the shape and the dimensions are usually according to the shape and the dimensions of the magnet body, and can be determined considering the shrinkage at sintering the molded body.

(2) Sintering Step

In the sintering step, the molded body is sintered to obtain the sintered body.

A sintering atmosphere is, for example, vacuum atmosphere or inert gas atmosphere, such as argon and helium, in some embodiments. The sintering temperature and the sintering period are not specifically limited and need to be adjusted according to various conditions, such as the composition of the raw material powder, the pulverization method at manufacturing, and the particle size distribution. However, for example, the conditions only need to be sintering for five hours at a temperature within the range from 900° C. or more to 1150° C. or less. The heating method for sintering is not specifically limited, and examples of which include resistance heating and high-frequency induction heating.

In the sintering step, the molded body shrinks at the same time when the molded body is baked and solidified. While a volume contraction percentage of the molded body changes according to the raw material powder, the molding condition of the molded body, the sintering condition, and the like, but the dimension of the sintered body generally becomes about 70% to about 80% of the molded body, and the volume of the sintered body becomes about 50% of the molded body.

(3) Processing Step

In the processing step, the removal process is performed on the surplus parts at the corner portions and in the vicinities of the corner portions of the sintered body to manufacture the magnet body. By thus performing the removal process on the sintered body, the newly exposed surface becomes the processed surface of the magnet body and the surface other than the processed surface of the magnet body becomes the non-processed surface.

The method of performing the removal process on the surplus parts at the corner portions and in the vicinities of the corner portions of the sintered body is not specifically limited as long as the method is a processing method that removes a part of the sintered body, and examples of which include polishing, grinding, and cutting. Since the shape and the dimensions of the magnet body manufactured in the processing step are similar to the shape and the dimensions of the magnet body described in "1. Magnet Body," the description thereof will be omitted here.

(4) Heat Treatment Step and Aging Process Step

The method for manufacturing the rare earth magnet further includes the heat treatment step that performs the heat treatment in the state where the diffusion material containing the rare earth element R2 is caused to be present on the processed surface of the magnet body in some embodiments. Because diffusing the rare earth element R2 into the surface part of the processed surface of the magnet body from the diffusion material allows modifying the surface part of the processed surface of the magnet body and recovering the magnetic properties of the rare earth magnet.

The method that causes the diffusion material containing the rare earth element R2 to be present on the processed surface of the magnet body is not specifically limited, and examples of the method include a method that forms a film of the diffusion material on the processed surface of the magnet body by, for example, PVD or CVD and a method that powders the diffusion material and coats the diffusion material over the processed surface of the magnet body. More specifically, examples of the method include a method that forms a sputtering film, a vapor deposition film, or the like of an alloy containing the rare earth element R2, such as a sputtering film or a vapor deposition film of the rare earth element R2, on the processed surface of the magnet body by, for example, PVD or CVD, a method that coats, for example, powders of the rare earth element R2, powders of a compound, such as an oxide, a fluoride, an acid fluoride, a hydride, and a hydroxide of the rare earth element R2, powders of an alloy containing the rare earth element R2 on the processed surface of the magnet body, and a method that disposes the magnet body in powders.

Since the rare earth element R2 is similar to the rare earth element R2 described in "2. Rare-Earth-Rich Layer and Diffusion Layer," the description is omitted here.

The atmosphere under which the heat treatment is performed is, for example, vacuum atmosphere or inert gas atmosphere in some embodiments. As long as the magnetic properties of the rare earth magnet can be recovered, the temperature of the heat treatment is not specifically limited, and the temperature is within the range of the sintering temperature or less of the magnet body in some embodiments, and, specifically, for example, within the range from 500° C. or more to 1000° C. or less in some embodiments. Because setting the temperature of the heat treatment to the upper limit or less of the range degenerates a structure of the magnet body, thereby allowing avoiding a problem, such as failing to obtain high magnetic properties. Additionally, because setting the temperature of the heat treatment to the lower limit or more of the range allows sufficiently obtaining the modifying effect of the surface part of the processed surface. As long as the magnetic properties of the rare earth magnet can be recovered, the period of the heat treatment is not specifically limited, and the period is within the range, for example, from 10 minutes or more to one hour or less in some embodiments. Because setting the period of the heat treatment to the lower limit or more of the range allows sufficiently obtaining the modifying effect of the surface part of the processed surface. Additionally, because setting the period of the heat treatment to the upper limit or less of the range allows avoiding a decrease in productivity and allows reducing a thermal influence on the magnet body.

When the method for manufacturing the rare earth magnet includes the heat treatment step, after the heat treatment step, an aging treatment process that performs an aging treatment on the magnet body is further included in some embodiments. Because the structure of the magnet body can be optimized and the recovery effect of the magnetic properties, such as coercivity, can be increased.

The atmosphere under which the aging treatment is performed is, for example, vacuum atmosphere or inert gas atmosphere in some embodiments. The temperature of the aging treatment is, for example, less than the temperature of the heat treatment in some embodiments, and specifically, for example, within the range from 400° C. or more to 600° C. or less in some embodiments. Because the magnetic properties, such as coercivity, can be sufficiently recovered. The period of the aging treatment is, for example, within the range from one minute or more to ten hours or less in some embodiments.

In the heat treatment step, by optimizing the temperature and the period of the heat treatment, the heat treatment may also perform the aging treatment to omit a part of or all of the aging treatment process.

(5) Others

The method for manufacturing the rare earth magnet according to the embodiment may include: a collection step of collecting the rare earth magnet including the magnet body described in "1. Magnet Body" from a motor; and the heat treatment step of performing the heat treatment in the state where the diffusion material containing the rare earth element R2 is caused to be present on the processed surface of the magnet body of the rare earth magnet. Because the rare earth magnet whose magnetic properties are recovered can be regenerated from the rare earth magnet whose magnetic properties, such as coercivity, was deteriorated by being used for the motor.

As the method for manufacturing the rare earth magnet according to the embodiment, a method for manufacturing the rare earth magnet according to a third embodiment will be further described as an example. FIG. 8A to FIG. 8D are schematic process cross-sectional views of the main part of the method for manufacturing the rare earth magnet according to the third embodiment.

Figure 8A:
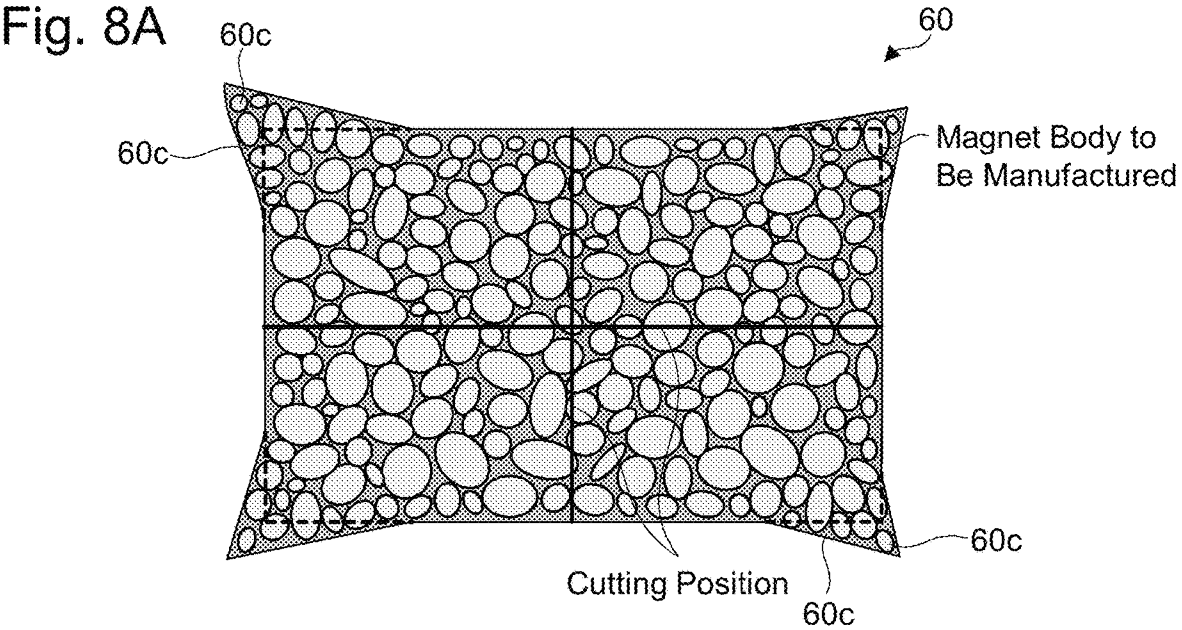
FIG. 8A to FIG. 8D are schematic process cross-sectional views of a main part of a method for manufacturing a rare earth magnet according to a third embodiment.
Figure 8B:
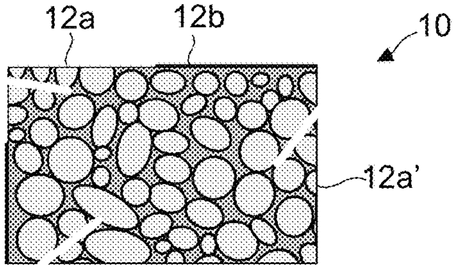
Figure 8C:
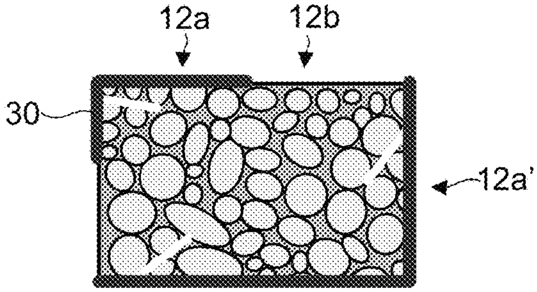
Figure 8D:
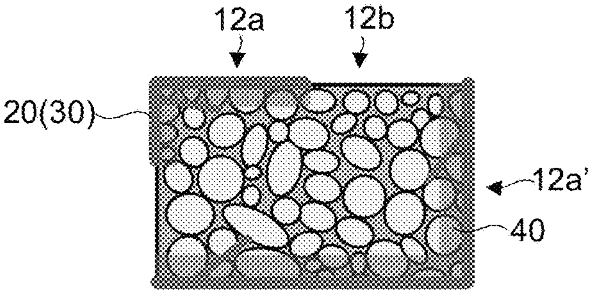

As illustrated in FIG. 8A, in the method for manufacturing the rare earth magnet according to the third embodiment, the sintered body 60 is manufactured similarly to the method for manufacturing the rare earth magnet according to the second embodiment illustrated in FIG. 6A and FIG. 6B and FIG. 7A to FIG. 7C. Next, as illustrated in FIG. 8B, the polishing process is performed on the surplus parts 60*c* at the corner portions and in the vicinities of the corner portions of the sintered body 60 in the processing step, and the cutting process is performed on the sintered body 60 at two surfaces parallel to the respective top surface and side surface of the sintered body 60 to manufacture the magnet body 10 produced by dividing the sintered body 60 into four. Next, as illustrated in FIG. 8C, in the heat treatment step, the heat treatment is performed in a state where the diffusion material 30 containing the rare earth element R2 is present on the processed surface (the polished surface) 12*a* and a processed surface (a cut surface) 12*a*' of the constituent surface 12 of the magnet body 10. In view of this, as illustrated in FIG. 8D, diffusing the rare earth element R2 into the surface parts of the processed surfaces 12*a* and 12*a*' of the magnet body 10 from the diffusion material 30 generates the diffusion layer 40 and modifies the surface parts of the surfaces. After the diffusion reaction, the diffusion material 30 is caused to remain to form the rare-earth-rich layer 20.

In the method for manufacturing the rare earth magnet according to the third embodiment, the subphases 10*b* are not removed from the surface parts of the non-processed surfaces 12*b* excluding the processed surfaces 12*a* and 12*a*' among the constituent surfaces 12 of the magnet body 10, and the crack 16 or stress due to processing strain does not occur. Furthermore, modifying the surface parts of the processed surfaces 12*a* and 12*a*' of the magnet body 10 and forming the rare-earth-rich layer 20 allow recovering the coercivity of the surface parts.

Like the procedure in FIG. 5, the method for manufacturing the rare earth magnet according to the embodiments may further include, in addition to the molding step, the sintering step, the processing step, and the heat treatment step, for example, the weighting and mixing step, the alloying step, the pulverization step, the magnetic property test step, the surface treatment step, the inspection process, and the magnetization step. Note that when the method for manufacturing the rare earth magnet includes the aging treatment process and the surface treatment step, the aging treatment process is a step before the surface treatment step.

EXAMPLES

The following will further specifically describe the rare earth magnet and the method for manufacturing the same of the present disclosure with Reference Examples.

Reference Example 1

First, a sintered body before being molded to a Nd—Fe—B-based magnet body was prepared. Next, by polishing the entire surface of the sintered body, a magnet body having a rectangular parallelepiped shape of 5 mm in width (W), 20 mm in length (L), and 3 mm in height (H) was obtained. Thus, the rare earth magnet including the magnet body all of whose entire constituent surfaces were processed surfaces on which the removal process was performed was manufactured.

Reference Example 2

First, the magnet body obtained in Reference Example 1 was prepared, the magnet body was disposed in powders of an alloy containing Nd such that all of the entire constituent surfaces of the magnet body were disposed in the powders of the alloy containing Nd. Accordingly, a diffusion material containing the powders of the alloy containing Nd was caused to be present in all of the entire constituent surfaces of the magnet body.

Next, the heat treatment was performed on the magnet body in which the diffusion material was caused to be present on all of the entire constituent surfaces with conditions of vacuum atmosphere at the temperature of 900° C. for 30 minutes. Next, the aging treatment was performed on the magnet body on which the heat treatment had been performed with conditions of vacuum atmosphere at the temperature of 550° C. for 60 minutes. Thus, a rare earth magnet that included the magnet body and a layer after the treatment of the diffusion material was manufactured.

[SEM Observation and EPMA Measurement]

Figure 9:
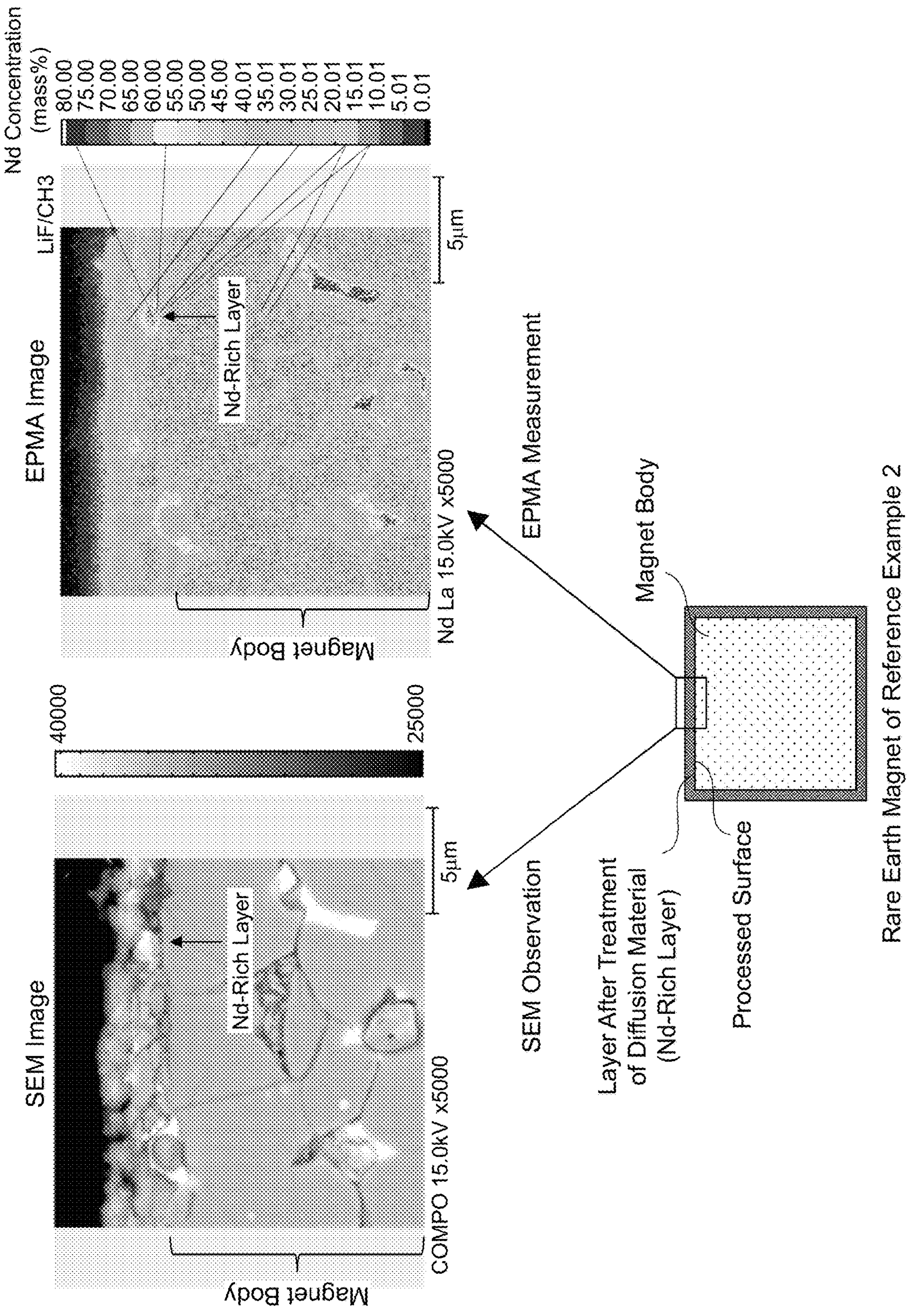
FIG. 9 includes drawings illustrating a SEM image of a cross-sectional surface at a boundary between a magnet body and a layer after a treatment of a diffusion material in a rare earth magnet according to Reference Example 2 and an EPMA image of an amount of Nd of the cross-sectional surface.

A cross-sectional surface at a boundary between the magnet body and the layer after the treatment of the diffusion material in the rare earth magnet according to Reference Example 2 was observed with scanning electron microscope (SEM). Additionally, an amount of Nd at each position of the cross-sectional surface was measured with electron probe micro analyzer (EPMA). FIG. 9 includes drawings illustrating the SEM image and the EPMA image of the amount of Nd of the cross-sectional surface at the boundary between the magnet body and the layer after the treatment of the diffusion material in the rare earth magnet according to Reference Example 2.

It can be confirmed from the SEM image and the EPMA image of the amount of Nd in FIG. 9 that an Nd-rich layer (the rare-earth-rich layer) is formed on the processed surface of the magnet body. Accordingly, it is considered that the diffusion of Nd into the surface part of the processed surface of the magnet body generates the diffusion layer and modifies the surface part of the processed surface of the magnet body.

[Evaluation for Magnetic Properties]

Figure 10A:
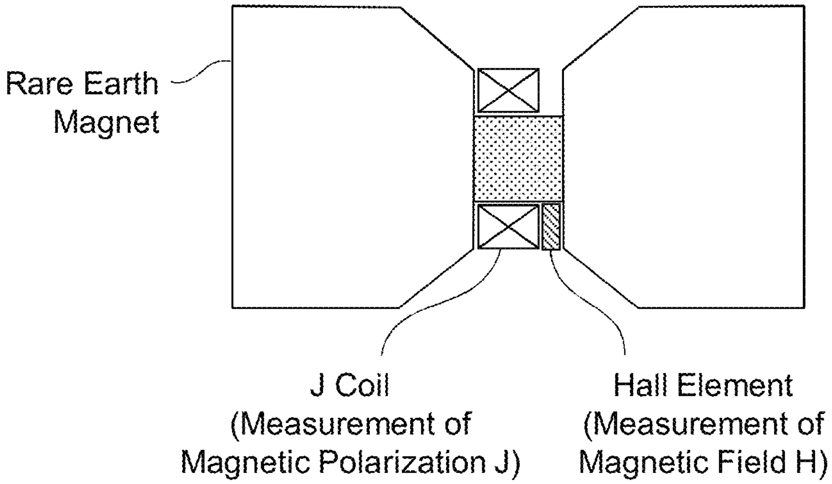
FIG. 10A is a schematic cross-sectional view illustrating a B-H curve tracer compliant with JIS C 2501 as a measurement device used to measure a J-H curved line.
Figure 10B:
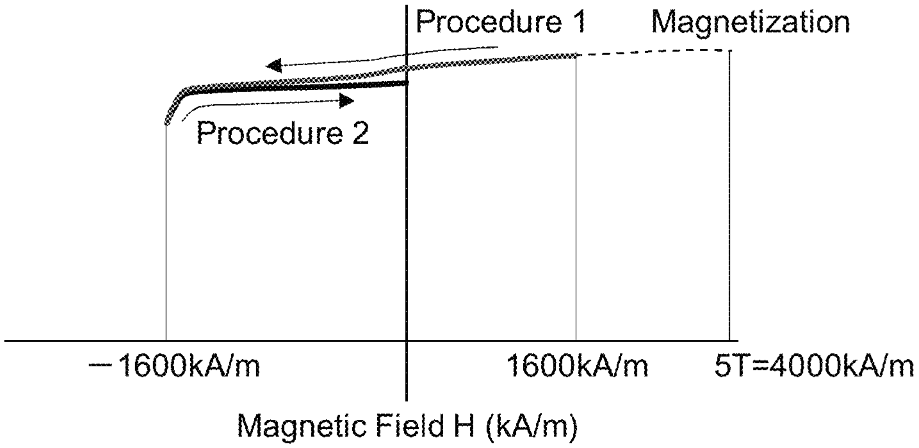
FIG. 10B is a graph illustrating a procedure to apply a magnetic field in the measurement of the J-H curved line.

J-H curved lines in a case where reverse magnetic fields were applied to the rare earth magnets of Reference Examples 1 and 2 and subsequently the reverse magnetic fields were removed were measured. FIG. 10A is a schematic cross-sectional view illustrating the B-H curve tracer compliant with JIS C 2501 as a measurement device used to measure the J-H curved line, and FIG. 10B is a graph illustrating a procedure to apply the magnetic field in the measurement of the J-H curved line.

Figure 11:
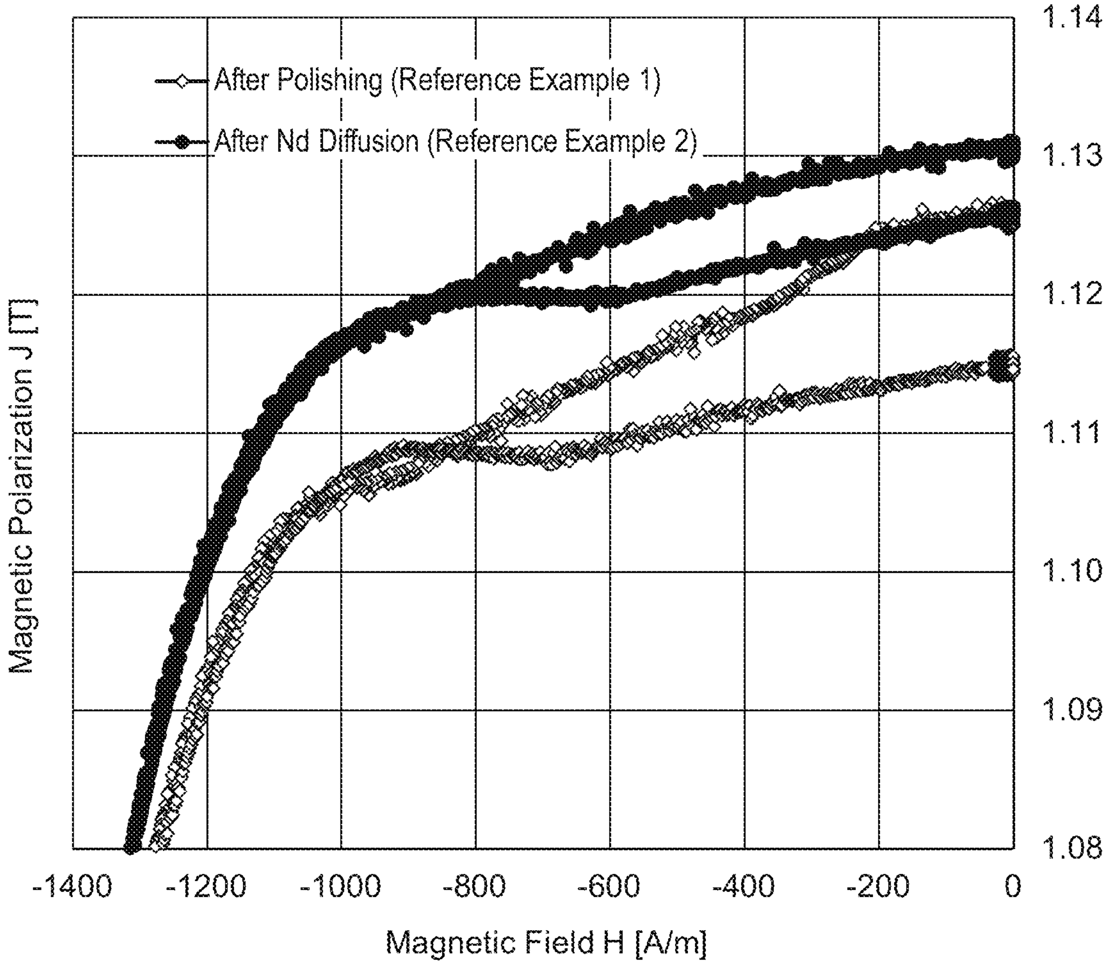
FIG. 11 is a graph illustrating J-H curved lines in measurements of rare earth magnets of Reference Examples 1 and 2.

To measure the J-H curved line, first, a magnetic field H at 5 T (magnetic field H 4000 kA/m) was applied to the rare earth magnet by pulse magnetization method to magnetize the rare earth magnet. Subsequently, by the use of the B-H curve tracer illustrated in FIG. 10A, as illustrated in FIG. 10B, in a process of changing the magnetic field H from +1600 kA/m to the reverse magnetic field of −1600 kA/m and after that changing the magnetic field H from the reverse magnetic field of −1600 kA/m to 0 kA/m, a magnetic polarization J [T] was measured. FIG. 11 is a graph illustrating the J-H curved lines in the measurements of the rare earth magnets of Reference Examples 1 and 2.

It can be confirmed from the J-H curved lines illustrated in FIG. 11 that while demagnetization occurs even at the small reverse magnetic field and the demagnetization increases as the reverse magnetic field increases in the rare earth magnet of Reference Example 1, when the reverse magnetic field is small, demagnetization does not occur in the rare earth magnet of Reference Example 2 to the extent of Reference Example 1. It can be seen that the amount of demagnetization of the rare earth magnet of Reference Example 2 is around ½ of the rare earth magnet of Reference Example 1. Moreover, it can be confirmed that in the J-H curved line of the rare earth magnet of Reference Example 2, the magnetic polarization J at the magnetic field H of −900 kA/m becomes high, around 1.12 T.

While the embodiments of the present disclosure have been described in detail above, the present disclosure is not limited thereto, and can be subjected to various kinds of changes in design without departing from the spirit of the present disclosure described in the claims.

All publications, patents and patent applications cited in the present description are herein incorporated by reference as they are.

DESCRIPTION OF SYMBOLS

1 Rare earth magnet
10 Magnet body
**10*a*** Main phase particle (main phase)
**10*b*** Subphase
**10*s*** Surface
12 Constituent surface
12A Region in vicinity of corner portion
**12*a*** Processed surface (polished surface)
**12*a*'** Processed surface (cut surface)
12B Region at center
**12*b*** Non-processed surface
14 Corner portion
16 Crack
20 Rare-earth-rich layer
40 Diffusion layer
5 Raw material powder
50 Molded body
60 Sintered body
**60*c*** Surplus part at corner portion and in vicinity of corner portion
30 Diffusion material

What is claimed is:

1. A rare earth magnet comprising:

a magnet body containing a rare earth element R1, a transition metal element T, and boron B, and a rare-earth-rich layer, wherein the magnet body is composed of a sintered body including main phase particles and subphases that are present surrounding main phase particles, wherein the shape of the magnet body is a rectangular parallelepiped whose constituent surfaces are six rectangular constituent surfaces, wherein a corner region in each of the six rectangular constituent surfaces of the magnet body is an exposed surface of the inside of the sintered body where the subphases are removed and the surface regions of the main phase particles are exposed, wherein the corner region is at a part where at least two rectangular constituent surfaces among the six rectangular constituent surfaces of the magnet body intersect, wherein the at least two rectangular constituent surfaces perpendicularly intersect with each other, wherein a center region closer to a center than the corner region in each of the six rectangular constituent surfaces of the magnet body is an outer surface of the sintered body where the inside of the sintered body is not exposed, wherein the rare-earth-rich layer is disposed on the corner region in each of the six rectangular constituent surfaces of the magnet body, and the rare-earth-rich layer is not disposed on the center region in each of the six rectangular constituent surfaces of the magnet body, wherein the rare-earth-rich layer is a layer which is richer in a rare earth element R2 than a surface part of the corner region in each of the six rectangular constituent surfaces of the magnet body, wherein a diffusion layer is disposed on the surface part of the corner region in each of the six rectangular constituent surfaces of the magnet body, wherein the diffusion layer is a layer in which the rare earth element R2 is diffused into the surface part of the corner region in each of the six rectangular constituent surfaces of the magnet body and is a layer which is richer in the rare earth element R2 than the inside of the magnet body, and wherein the rare earth element R2 contains one or two selected from Dy and Tb.

* * * * *